Dec. 30, 1952

W. G. LISLE 2,623,502

AIRCRAFT CONTROL SYSTEM WITH FLUID OPERATED HOLDING DEVICE

Filed June 8, 1948

Inventor
WILLIAM GEORGE LISLE,

By Robert B Pearson
Attorney

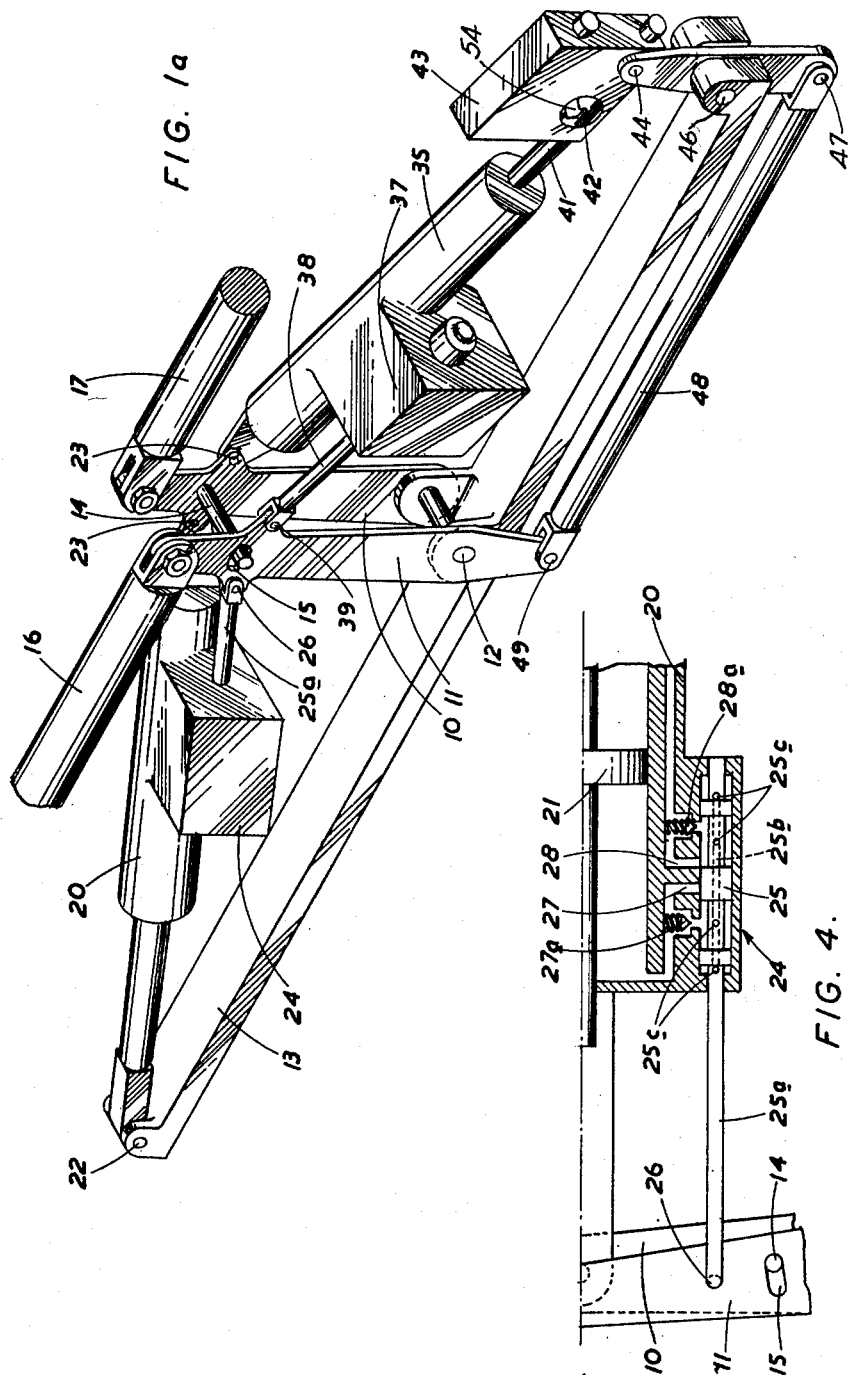

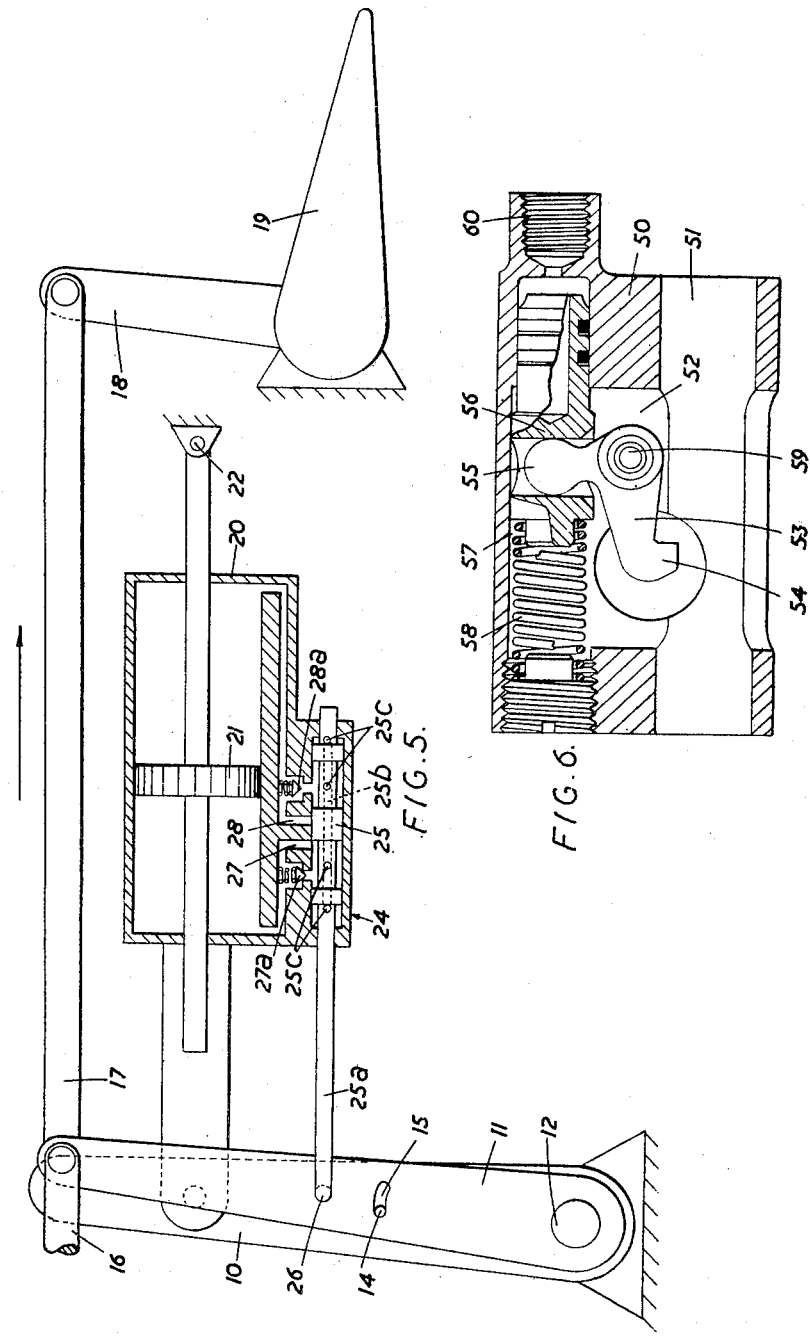

Dec. 30, 1952  
W. G. LISLE  
2,623,502  
AIRCRAFT CONTROL SYSTEM WITH FLUID OPERATED HOLDING DEVICE  
Filed June 8, 1948  
7 Sheets-Sheet 6

Inventor  
WILLIAM GEORGE LISLE,  
By Robert B. Pearson  
Attorney

Dec. 30, 1952 W. G. LISLE 2,623,502
AIRCRAFT CONTROL SYSTEM WITH FLUID
OPERATED HOLDING DEVICE
Filed June 8, 1948 7 Sheets-Sheet 7

Inventor
WILLIAM GEORGE LISLE,
By Robert B Pearson
Attorney

Patented Dec. 30, 1952

2,623,502

UNITED STATES PATENT OFFICE 2,623,502

AIRCRAFT CONTROL SYSTEM WITH FLUID OPERATED HOLDING DEVICE

William George Lisle, East Bedfont, England, assignor to The Fairey Aviation Company Limited, Hayes, England Application June 8, 1948, Serial No. 31,814
In Great Britain June 12, 1947

6 Claims. (Cl. 121—40)

This invention relates to improved hydraulic power-operated flying control systems for aircraft. An acknowledged advantage of power-operated systems is the possibility of eliminating all forms of aerodynamic control surface balance devices, with consequent weight saving and simplification. This is possible because the power servo unit, if located close to the control surface being operated, can act as an irreversible unit. The term "irreversible" is not used in the sense that the power unit cannot be caused to operate in opposite directions, but in the sense that "flutter," or transmission to the pilot of any suddenly applied load increases or reversals, is prevented.

In some control systems the arrangement is such that the pilot is enabled to provide manual control if the hydraulic power fails or is deliberately cut off, and the present invention is concerned with such systems, and in particular with such systems in which the normal jack or other actuator is mechanically disconnected from the system.

It will be seen that with such systems in the "power off" condition the power servo unit can no longer act as an irreversible unit, and it is an object of the present invention to provide a system having a substitute source of irreversibility.

According to the present invention a hydraulic power-operated flying control system for an aircraft control surface has a linkage arranged normally to operate the control surface by means of a component such as a pressure fluid servo-motor actuated by hydraulic pressure, the component being arranged to form part of, or be operatively replaced by, a mechanical connection between the pilot's control and the control surface, for manual operation of said control surface, for example, when the hydraulic pressure is not operative, wherein there is provided an independent irreversible hydraulic component arranged so that, when the hydraulic pressure is not operative, said component does not interfere with the pilot's manual control of the control surface, but resists any reverse action of the control surface on the pilot's manual control, regardless of the direction of motion of said pilot's control means.

The irreversible component may comprise a piston and a cylinder, one of which is anchored to the aircraft and the other of which is connected with the control surface, a selector valve operably connected with the pilot's control, and a bye-pass valve, normally held open to permit fluid communication between the opposite sides of the piston and thus render the irreversible component inoperative so long as the aircraft hydraulic pressure is "live."

The selector valve and bye-pass valve may be located outside the cylinder.

Alternatively the irreversible component may comprise a piston and a cylinder, one of which is anchored to the aircraft and the other of which is connected with the control surface, and an operating valve located within the piston and operably connected with the pilot's control.

Either irreversible component may be actuated through lost motion means in the linkage connected with the pilot's control.

Embodiments of the invention will be described with reference to the accompanying drawings, in which:

Figure 1A is a perspective view of the apparatus in Figure 1.

Figures 3, 4 and 5 are fragmentary diagrammatic side elevations of another form of apparatus, with parts shown, respectively in the three figures, in different positions relatively to one another.

Figure 6 is a sectional elevation of a servo-release unit forming part of the apparatus appearing in Figures 1, 1A and 2.

Figure 1:
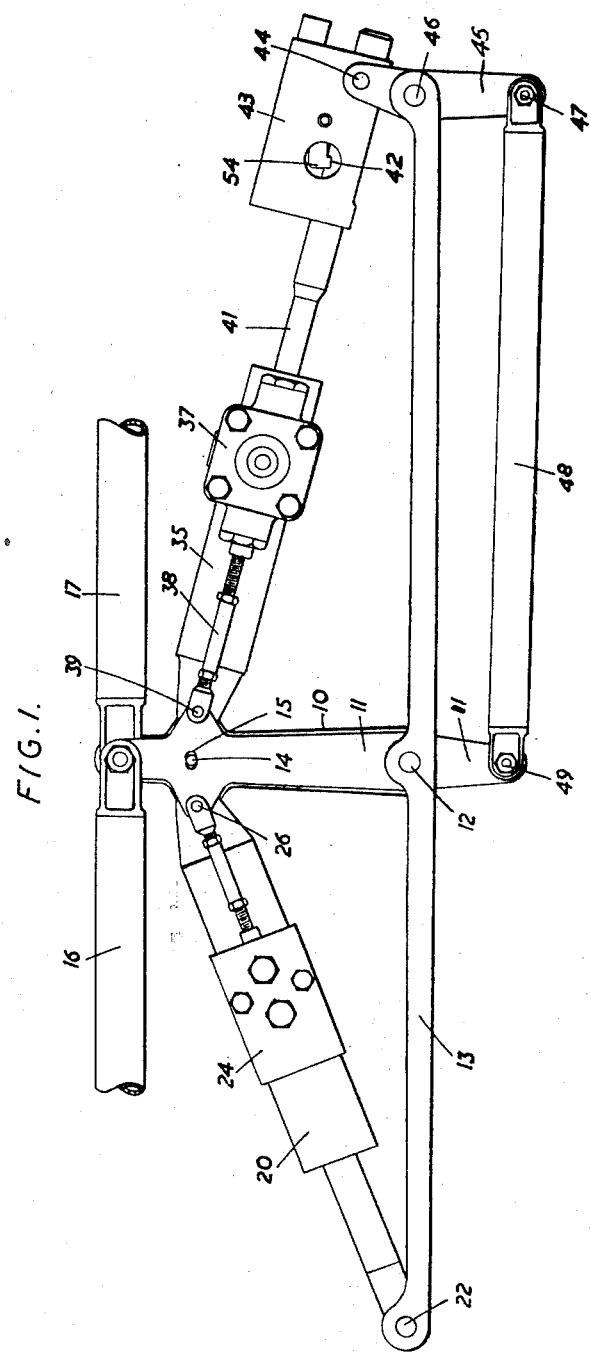
Figure 1 is a side elevation of part of a control system.

One form of control system to which the invention may be applied will be described with reference to Figures 1, 1A, 2 and 6. Two levers, termed the "pressure fluid servo-motor lever" 10 and "valve lever" 11 respectively, for reasons which will be apparent later, are mounted on a common pivot 12 on the aircraft structure, which for convenience is represented in Figure 1 by the bar 13. The pressure fluid servo-motor lever 10 is provided with a stud 14 projecting into a short arcuate slot 15 formed in the valve lever 11, the arrangement being such that the pressure fluid servo-motor lever 10 can move through a small angle in either direction independently of the valve lever 11, after which the stud 14 impinges against one or other of the ends of the slot 15, and the levers 10 and 11 then move as one. The valve lever 11 is thus permitted a corresponding amount of lost motion relatively to the pressure fluid servo-motor.

A control linkage 16 from the pilot's control is connected with the free end of the valve lever 11, and a linkage 17, to operate the control surface to be actuated is connected with the free end of the pressure fluid servo-motor lever 10.

The irreversible unit comprises a hydraulic holding or locking device having a cylinder 20 and a piston 21 pivotally secured at 22 to part of the aircraft structure. The cylinder 20 is pivotally secured at 23 to the pressure fluid servo-motor lever 10 near its free end. This holding device is controlled by a selector valve 24 having a valve piston 25 pivotally connected with the valve lever 11 at 26, at the same radius as the pivot 23 with respect to the pivot 12. The valve 24, and valve ports 27, 28 are arranged to constitute an independent closed hydraulic circuit to permit fluid to flow at choice, from either end of the cylinder 20 to the other, but not simultaneously in the other direction. For this purpose spring-urged non-return valves 27a, 28a are arranged alongside the ports 27, 28, and the piston rod 25a of the piston 25 is formed with a transfer passage 25b having ports 25c in communication with the interior of the chamber of the valve 24.

The ends of the cylinder 20 on opposite sides of the piston 21 are also connected together by a pipe 29 in which there is a bye-pass valve 30 normally held open to permit communication between said ends. The valve 30 (see Figure 2) consists of a valve piston 31 slidable in a valve body 32, the valve piston 31 being spring-urged by a compression spring 33 tending to close the bye-pass, and the spring pressure being resisted, on the other side of the valve piston 31, by hydraulic pressure from the normal hydraulic circuit of the aircraft, with which the bye-pass valve body is connected by a pipe 34. Thus, so long as the normal hydraulic pressure is being exerted, the bye-pass valve 30 is held open, but when this pressure is inoperative, either by failure or intentional cutting off, the bye-pass valve 30 is closed by the spring 33.

The piston 21 has a hollow stem 21a containing a recuperator piston 21b urged by a recuperator spring 21c, the hollow interior of the stem 21a being formed with a passage 21d extending radially to the periphery of the piston 21. As the holding device 20, 21 and its associated components constitute a closed hydraulic circuit, it is necessary to provide means to compensate for volumetric increase and decrease of the fluid content caused by temperature changes. The recuperator spring 21c exerts load upon the recuperator piston 21b, which transmits the load to the fluid column within the follow stem 21a, which is in communication with an annular groove 21e on the piston 21, via the passage 21d. The sliding surfaces of the piston 21 and cylinder 20 provide a highly restricted communication between the groove 21e and interior of the cylinder 20.

Increase in temperature causes the pressure of the fluid in the holding device to become greater than the pressure exerted on the recuperator fluid by the influence of the spring 21c. Fluid will therefore flow from the cylinder 20 into the hollow stem 21a until the cylinder pressure and the recuperator spring pressure are balanced.

Under the influence of a decrease in temperature the pressure of the fluid in the cylinder 20 will become less than the pressure of the fluid in the recuperator 21a and fluid will flow from the recuperator 21a into the cylinder 20 by seepage from the annulus 21e between the piston 21 and the cylinder wall.

Located on the other side of the pressure fluid servo-motor lever 10 and valve lever 11 is a power pressure fluid servo-motor 35 arranged normally to actuate the control surface. The power pressure fluid servo-motor body 36 is connected pivotally with the pressure fluid servo-motor lever 10 at 23', at a radius equal to the radius of the pivot 23, while the selector valve 37 of the power pressure fluid servo-motor 35 is connected pivotally with the valve lever by a rod 38 at the pivot 39 at the same radius as is the pivot 26 of the holding or irreversible unit. The power pressure fluid servo-motor piston 40 has a piston rod 41 formed with a notch 42, the outer end of the piston rod 41 being slidably mounted in a servo release unit 43, to be hereinafter described, and the servo release unit 43 is pivotally mounted, at a point 44 on the axis of the power pressure fluid servo-motor piston rod 41, at one end of a lever 45, termed a "feel back lever," which is pivotally mounted, at a point 46 intermediate its length, on the aircraft structure exemplified by the bar 13. The other end of the feel back lever 45 is connected at 47 to a link 48 which in turn is connected at 49 with the free end of an extension of the valve lever 11 on the side of the fulcrum 12 thereof remote from the free end with which the pilot's control linkage 16 is connected.

The servo release unit 43 (see Figure 6) consists of a body 50 formed with a passage 51 to accommodate slidably the piston rod 41 of the power pressure fluid servo-motor 35. Pivotally mounted in a recess 52 in the body 50 and adjacent to the passage 51 is a two-armed member formed similarly to a bell-crank lever, one arm 53 lying approximately parallel with the passage 51 and having at its free end a projecting nose 54 arranged to enter the notch 42 in the power pressure fluid servo-motor piston rod 41 and to lock said piston rod relatively to the body 50 of the servo release unit when it is in the notch 42. The other arm has a ball head 55 which is embraced by a piston 56 slidable in a passage 57 extending within the body 50 and parallel with the passage 51 which receives the power pressure fluid servo-motor piston rod 41. A compression spring 58 is provided in this second passage 57 and arranged to urge the piston 56 to move the arms 53, 55 about the pivot 59 so as to move the projecting nose 54 out of the notch 42 in the piston rod 41 of the power pressure fluid servo-motor 35, while at the other end of the passage 57 is a nozzle 60 arranged to be connected by a pipe 61 with the pressure supply of the aircraft to supply pressure fluid to bear against the piston 56 of the servo release unit 43 and force the nose 54 into the notch 42 against the pressure of the spring 58. Thus, so long as the hydraulic pressure of the main system is operative, the nose 54 is kept in the notch 42 and the piston rod 41 is kept locked relatively to the body 50 of the servo release unit.

Figure 2:
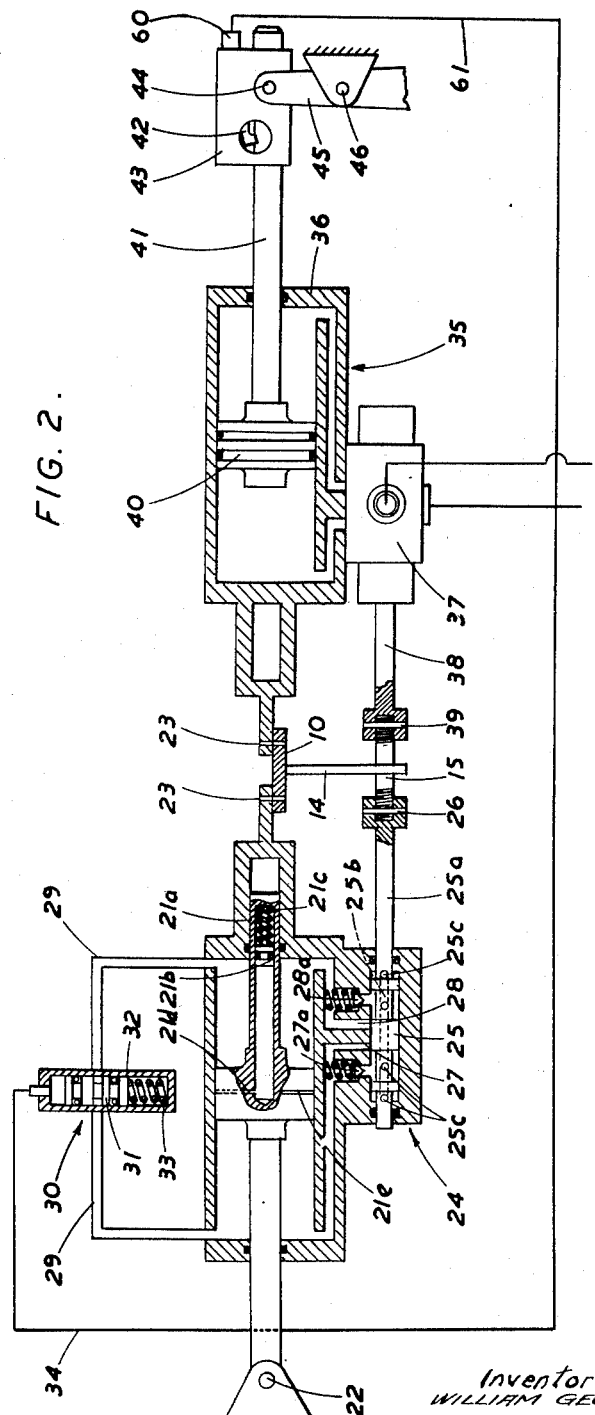
Figure 2 is a sectional plan view showing purely diagrammatically the functional features of the apparatus of Figures 1 and 1A.

During normal operation, see Figure 2, when the hydraulic pressure of the main system of the aircraft is operative, the bye-pass valve 30 is kept open, and hydraulic fluid can therefore pass freely from one side to the other of the piston 21 of the irreversible component. This component is therefore inoperative, and exercises no influence on the system as a whole. Movement imparted to the pilot's control linkage 16 moves the valve lever 11, at first independently of the pressure fluid servo-motor lever 10, and during this first independent movement the selector valve 37 of the power pressure fluid servo-motor 35 is operated to admit pressure fluid to the pressure fluid servo-motor. Since the servo release unit 43 keeps the power pressure fluid servo-motor piston rod 41 locked, the power pressure fluid servo-motor 35 reacts upon the feel back lever 45, connecting link 48, valve lever 11, pressure fluid servo-motor lever 10 (which owing to the stud and slot connection 14, 15 now moves as one with the valve lever), and control linkage 17 to the control surface to be actuated, at the same time producing a "feel" on the pilot's control linkage 16. This "feel" is due to the relief that the pilot experiences as a result of the force due to the servo-motor augmenting the pilot's action on the assembly 16, 11 in overcoming the reaction of the control surface.

Referring to Figures 1, 1A, and 2 assume fluid from selector valve 37 enters to the left of piston 40 when pilot moves lever 11 counterclockwise (Figure 1). The fluid pressure moves 35 and 36 to left, which moves the control surface linkage left and at the same time pressure is exerted on piston 40 to urge it to the right in Figure 2. This force is imparted to linkage 45, 48 (which is urged to the left in Figure 1) and back to lever 11. The force on lever 11 is in a clockwise direction or opposite to motion of pilot's control linkage and to the movement of pilot's control 16, so that "feel" is produced.

It will be seen that this admission of fluid under pressure to the left-hand face of the piston 40 causes the pivots 23′ and 44 to separate (see Figure 1A). Thus, there is a force moving the linkage 17 to the left, to operate the control surface, and a force tending to move the linkage 16 to the right so as to oppose the pilot's action, thus giving him the required "feel." However, the force on the linkage 16 is considerably less than that on the linkage 17 because the distance between the pivots 23′ and 12 is substantially greater than that between the pivots 44 and 46.

Should the hydraulic pressure of the main system fail, or be cut off intentionally, the bye-pass valve 30 is at once closed and the servo release unit 43 is now actuated by its spring 58 to disengage the power pressure fluid servo-motor piston rod 41 from the servo release unit body 50. The power pressure fluid servo-motor 35 is thus not only inoperative, but freely slidable as a whole, and therefore exerts no further influence on the system. When now the pilot's control linkage 16 is actuated it operates the valve lever 11, and, after the lost motion of the stud 14 and slot 15 has been taken up, the pressure fluid servo-motor lever 10, and thus the control linkage 17, which is thus actuated purely mechanically and manually. Due to the lost motion, movement of the valve lever 11 by the pilot's control linkage 16 operates the valve 24 of the irreversible component to permit the cylinder 20 to be moved without resisting the actuation of the control surface, fluid passing, for example, from the left-hand end of the cylinder 20 out through the port 27, the adjacent port 25c, the transfer passage 25b, and back through the non-return valve 28a into the right-hand end of the cylinder 20, the end ports 25c being provided to prevent fluid from being trapped behind the end lands of the valve 24. At the same time, however, any reverse action produced by the control surface on the linkage 17 is resisted, as the appropriate one of the valve ports 27, 28 of the irreversible unit appropriate to flow in the other direction is closed, so locking the cylinder 20 against any tendency of the control surface 19 to operate the pilot's control linkage 16.

This operation is effected irrespective of the direction in which the pilot's control linkage 16 is moved.

Figure 3:
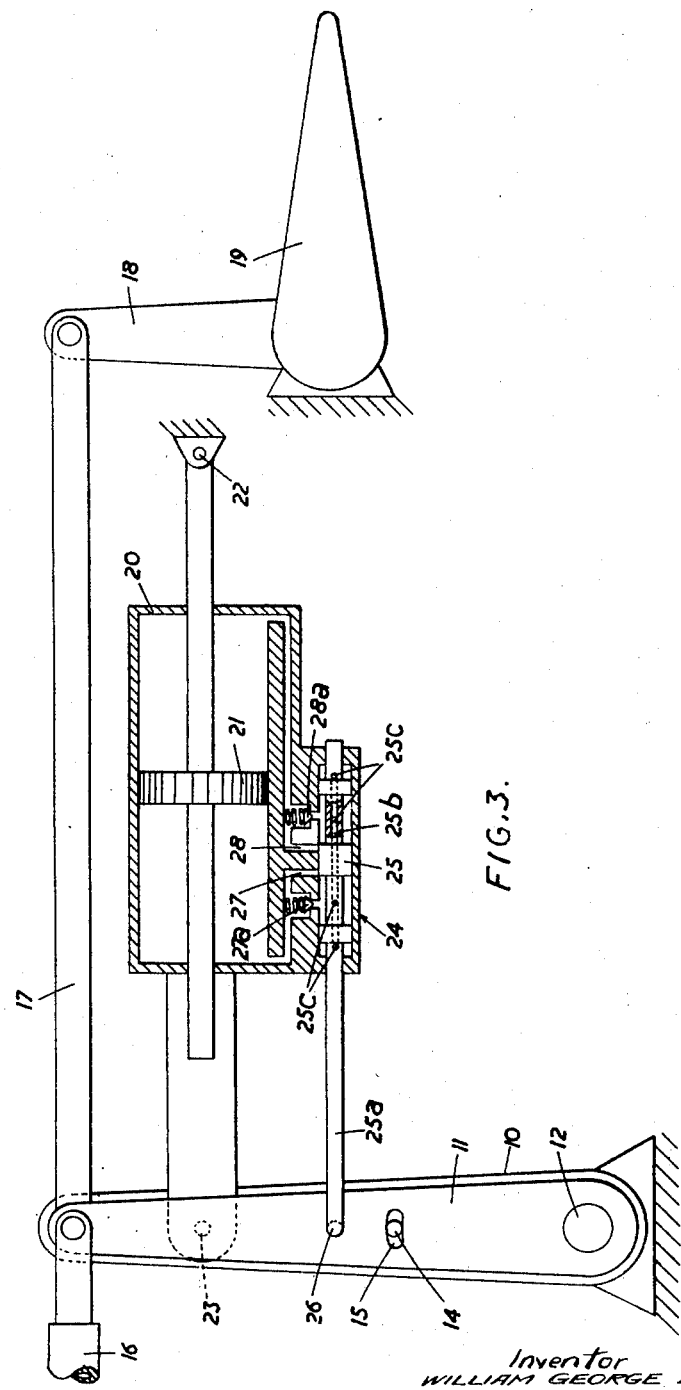

Figures 3, 4, and 5 show an arrangement in which the holding device or irreversible component of Figures 1, 1A and 2 is used alone, that is to say not in conjunction with any servo-motor. The same reference numerals are used, where possible, as in Figures 1, 1A and 2, and it will be observed that the linkage 17 is shown in Figures 3 to 5 as connected to a lever 18 on a control surface 19. When the parts are in the central position shown in Figure 3 the piston 25 closes the valve ports 27 and 28. Therefore, because both sides of the cylinder are filled with pressure fluid, any tendency for the surface 19 to move from its set position is resisted. Such movement would have to be transmitted by the linkage 18, 17 and pivot 23 to the cylinder 20 which cannot move with respect to the piston 21 owing to the closure of all the escape passages from both ends of the cylinder. Clearly also no tendency for the surface 19 to move is transmitted to the pilot.

Now supposing the pilot moves the linkage 16 so as to shift the lever 11 to the position of Figure 4. This results firstly in the piston 25 opening the port 28 but keeping the port 27 closed, and secondly in the right-hand end of the slot 15 engaging the stud 14 so that there is a direct mechanical connection to the surface 19, serving to move the latter as required. During this movement fluid is transferred from the right-hand end of the cylinder 20, through the port 28, transfer passage 25b and non-return valve 27a, to the left-hand end of the cylinder 20. When the surface 19 has been moved to the required extent, a small quick reversal of the pilot's movement will again cause the piston 25 to close both ports 27 and 28, thus locking the surface 19. The control surface will not follow the pilot in this small reversal because of the dash-pot effect of the various ports and passages in the valve 24.

Figure 5 shows the relative disposition of the parts when the left-hand end of the slot 15 engages the pin 14 during the movement of the pilot's linkage 16 to the right. The action in this case will be clear without further description, in that it is the reverse of that described with respect to Figure 4.

Figure 7:
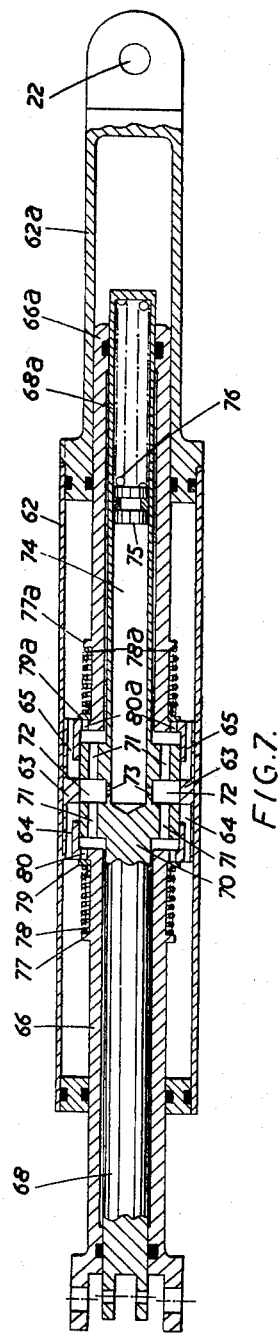
Figure 7 is a longitudinal section of third construction, shown locked in the neutral position.
Figure 8:
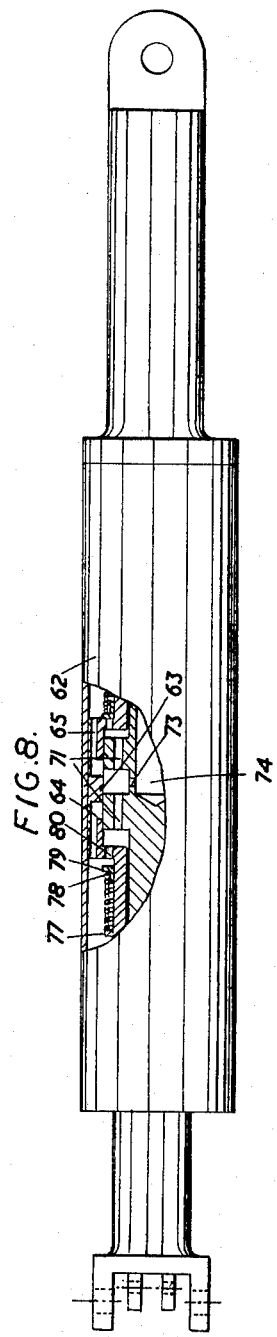
Figure 8 is a side elevation of the third construction, broken away to show the valve operated for retraction.
Figure 9:
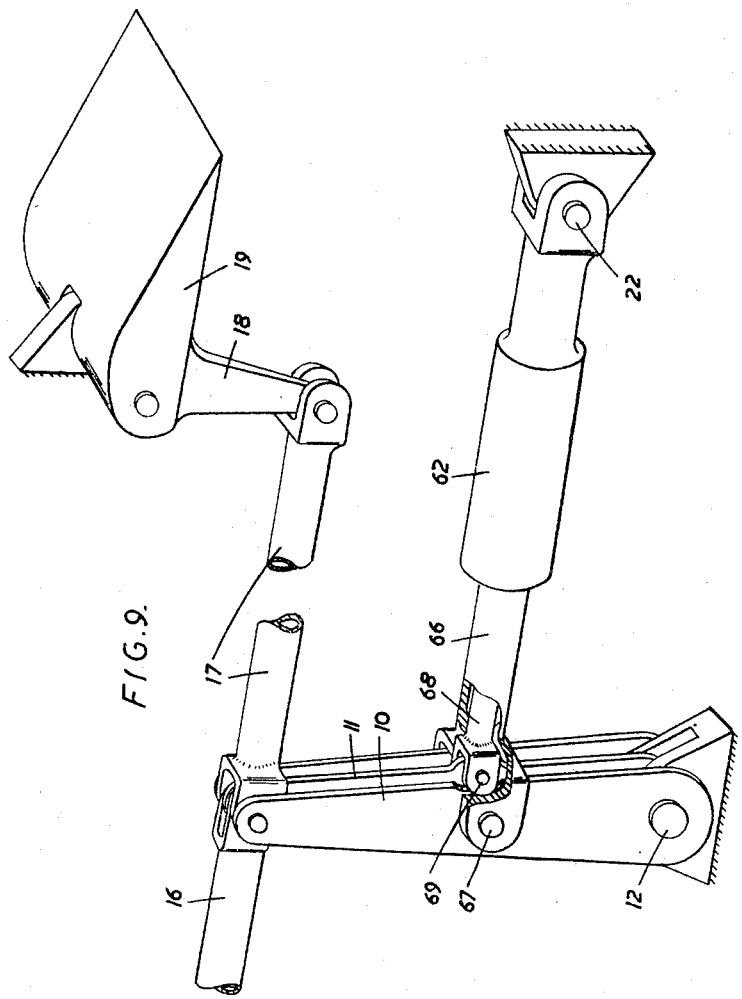
Figure 9 is a fragmentary perspective view of a linkage including the third construction.

In an alternative arrangement shown in Figures 7, 8 and 9, the selector valve for the holding device or irreversible component is arranged centrally, that is, within the piston.

The cylinder 62 is pivoted at 22 to the aircraft structure, and has within it a piston 63 with passages 64, 65 formed on each side thereof. The piston 63 is formed integral with a hollow piston rod 66 pivoted at 67 to the lever 10, and slidable within the piston rod 66 is a valve rod 68, pivoted at 69 to the valve lever 11.

The valve rod 68 is formed integral with a valve piston 70 within the hollow piston 63, and the pistons 63, 70 have corresponding piston rods 66a, 68a respectively on their other sides, the piston rod 66a being slidable in a reduced portion 62a of the cylinder 62 and the piston rod 68a being slidable in the piston rod 66a.

The valve piston 70 is formed with passages 71 communicating with an annular gallery 72 having bleed holes 73 communicating with the hollow interior 74 of the piston rod 68a, a recuperator piston 75 and recuperator spring 76 being provided within said piston rod for a purpose similar to that described with reference to Figure 2.

The exteriors of the piston rods 66, 66a are formed with annular flanges 77, 77a which serve as abutments for springs 78, 78a urging non-return valves 79, 79a against passages 80, 80a.

In the position shown in Figure 7, the parts are locked in the neutral position, and fluid is unable to flow from one side of the piston 63 to the other. Under the influence of a change in temperature, however, fluid can flow into or out of the recuperator chamber 74 by seepage across the valve lands until the cylinder pressure and recuperator pressure are balanced.

Figure 8 shows the valve piston 70 in its right-hand position with respect to the piston 63, by reason of the lost motion between the valve lever 11 and lever 10. Fluid can pass from the right-hand end of the cylinder 62 via the passages 65, 72, 71, 66, and the non-return valve 79, allowing the piston 63 to be moved to the right.

It will be noted that the system of Figures 1, 1A and 2 avoids disadvantages that would be encountered if the irreversible component were combined with the normal power pressure fluid servo-motor. Thus, as fluid might escape from the power pressure fluid servo-motor if the main hydraulic system failed, its fluid lock would be impaired. Again, as the power pressure fluid servo-motor is completely disconnected mechanically from the system, a safeguard is provided against seizure of the pressure fluid servo-motor. A further drawback in the use of the main power pressure fluid servo-motor as an irreversible unit is that the area of the ports would have to be considerably increased in order to achieve sufficiently low fluid resistance during the manual operation.

The invention may be applied to other types of control system. For example, it may be applied to the system described in the Patent No. 2,488,173.

I claim:

1. In an aircraft having a control surface, pilot's control means, and means, including a mechanical connection between the pilot's control means and the control surface, for transmitting movements of the pilot's control means to said control surface, the combination comprising a piston and hydraulic fluid containing cylinder arrangement connected to said mechanical connection so that movement of said control surface causes relative movement of said piston and cylinder, a passageway for connecting opposite ends of said cylinder, and control valve means in said passageway including firstly non-return check valve means and secondly manual valve means controlled by said pilot's control means for regulating flow of fluid between opposite ends of said cylinder so as to lock said piston and cylinder against substantial relative movement and thereby to lock said control surface against substantial movement except when the surface is moving in response to the pilot's control means, said check valve means comprising a valve element associated with each end of said cylinder and arranged to lift automatically to admit fluid to the associated end of said cylinder when fluid is released from the opposite end under control of said manual valve means.

2. The structure set forth in claim 1, in which said mechanical connection includes lost motion means.

3. In an aircraft having a control surface, pilot's control means, hydraulic servomotor means under the control of the pilot's control means for operating said control surface, and a mechanical connection between said pilot's control means and said control surface for use in place of said hydraulic servomotor means, the combination comprising a piston and hydraulic fluid containing cylinder arrangement, one element of said piston and cylinder arrangement being anchored to the aircraft and the other being connected with the control surface, a passageway for connecting opposite ends of said cylinder, control valve means in said passageway for regulating flow of fluid between opposite ends of said cylinder, said control valve means including a selector valve operably connected with the pilot's control means so as to lock said piston and cylinder against substantial relative movement and thereby to lock said control surface against substantial movement except when the surface is moving in response to the pilot's control means, said passageway being formed with two pairs of ports communicating respectively with the ends of said cylinder, one port in each pair being controlled by said selector valve, check valves controlling the other ports in said pairs and each arranged to open automatically to admit fluid to said cylinder and hydraulically controlled valve means for bypassing fluid between the ends of said cylinder to render the locking arrangement inoperative when said hydraulic servomotor means is in use.

4. The construction set forth in claim 1, said piston being hollow and having a hollow piston rod, said passageway being located in said piston, and a control rod connected to said pilot's control means and extending into said piston rod to comprise the operable connection between the pilot's control means and said control valve means.

5. A control system for aircraft having a pilot's control and a control surface, comprising a hydraulic power operated control system including a servomotor having one end anchored to datum and a control valve for the servomotor; a first lever connected with the control valve of the servomotor and mechanically connected to said pilot's control; a second pivoted lever mechanically linked to said control surface and to the other end of said servomotor; a mechanical connection including lost motion means providing a connection between said levers; a mechanical linkage connecting said pilot's control means and said control surface for manual actuation of said control surface, said mechanical linkage including said levers and said lost motion means; hydraulic locking means for locking said control surface against substantial movement except when the control surface is moving in response to the pilot's control means, said hydraulic locking means including a hydraulic piston and cylinder arrangement connected to datum and to said second lever, whereby movement of said control surface causes relative movement between said piston and cylinder, passageway means providing a connection between opposite ends of the cylinder, and control valve means under the control of said first lever for controlling said passageway means and operable to permit flow of fluid through said passageway means only in a direction corresponding to movement of said control surface in response to movement of said pilot's control spring-loaded non-return valves associated with opposite ends of said locking cylinder for sharply arresting any sudden reversal of the fluid flow; and disabling means for rendering said hydraulic locking means inoperative when said hydraulic power operated control system is in use, said disabling means including a hydraulically actuated valve means adapted to put both ends of said locking cylinder into communication with one another when said last-mentioned valve is open.

6. A control system as set forth in claim 5, said control valve means of said hydraulic locking means including valve body means and valve piston means, one of said means being carried by said cylinder and the other being attached to and movable with said first lever, said hydraulic power operated control system including a source of hydraulic pressure, said disabling means for said hydraulic locking means including second passageway means for providing free movement of fluid between the ends of said cylinder, and hydraulically actuated valve means in said passageway, said hydraulically actuated valve means being of the normally closed type but being connected to said hydraulic pressure source so as to be held open by fluid pressure from said hydraulic pressure source, whereby said locking means is disabled except upon failure of said hydraulic pressure source.

WILLIAM GEORGE LISLE.

REFERENCES CITED

The following references are of record in the file of this patent:

UNITED STATES PATENTS

| Number | Name | Date |
|---|---|---|
| 250,103 | Reynolds | Nov. 29, 1881 |
| 505,764 | Harden | Sept. 26, 1893 |
| 852,445 | Mellin | May 7, 1907 |
| 2,200,562 | O'Rourke | May 14, 1940 |
| 2,365,247 | Carlton | Dec. 19, 1944 |
| 2,441,264 | Eaton | May 11, 1946 |
| 2,488,173 | Churn | Nov. 15, 1949 |
| 2,503,956 | Lisle | Apr. 11, 1950 |
| 2,523,696 | Hadfield | Sept. 26, 1950 |

FOREIGN PATENTS

| Number | Country | Date |
|---|---|---|
| 710,182 | France | Jan. 30, 1931 |